(12) United States Patent
Liao

(10) Patent No.: US 12,025,883 B2
(45) Date of Patent: Jul. 2, 2024

(54) LIQUID CRYSTAL DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Dong Liao, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/427,091

(22) PCT Filed: Jun. 15, 2021

(86) PCT No.: PCT/CN2021/100135
§ 371 (c)(1),
(2) Date: Dec. 15, 2022

(87) PCT Pub. No.: WO2022/257159
PCT Pub. Date: Dec. 15, 2022

(65) Prior Publication Data
US 2024/0012291 A1  Jan. 11, 2024

(30) Foreign Application Priority Data
Jun. 9, 2021 (CN) .......................... 202110641753.0

(51) Int. Cl.
*G02F 1/1337* (2006.01)
*G02F 1/1333* (2006.01)
(Continued)

(52) U.S. Cl.
CPC .. *G02F 1/133723* (2013.01); *G02F 1/133397* (2021.01); *G02F 1/13345* (2021.01);
(Continued)

(58) Field of Classification Search
CPC ........... G02F 1/13345; G02F 1/133742; G02F 1/1337; G02F 1/133397; G02F 1/133723; G02F 2202/42
See application file for complete search history.

(56) References Cited

U.S. PATENT DOCUMENTS

2003/0103172 A1* 6/2003 Ohe .................. G02F 1/133711
349/43
2017/0363914 A1 12/2017 Kunimatsu et al.

FOREIGN PATENT DOCUMENTS

CN 1106544 A 8/1995
CN 102621745 A 8/2012
(Continued)

OTHER PUBLICATIONS

International Search Report in International application No. PCT/CN2021/100135, dated Mar. 16, 2022.
(Continued)

*Primary Examiner* — Jessica M Merlin
(74) *Attorney, Agent, or Firm* — PV IP PC; Wei Te Chung; Zhigang Ma

(57) ABSTRACT

The present invention provides a liquid crystal display panel and a display device. The liquid crystal display panel includes an array substrate, a counter substrate, and a liquid crystal layer. The array substrate includes a first alignment layer and a second alignment layer. The second alignment layer is arranged on one side of the first alignment layer away from the liquid crystal layer. A dielectric constant of the first alignment layer is less than a dielectric constant of liquid crystal molecules, and a dielectric constant of the
(Continued)

second alignment layer is greater than the dielectric constant of the liquid crystal molecules. Accordingly, the present invention not only ensures high light transmittance, but also prevents residual images.

20 Claims, 1 Drawing Sheet

(51) Int. Cl.
  *G02F 1/1334* (2006.01)
  *G02F 1/137* (2006.01)
(52) U.S. Cl.
  CPC ...... *G02F 1/1337* (2013.01); *G02F 1/133742* (2021.01); *G02F 1/13775* (2021.01); *G02F 2202/42* (2013.01)

(56) References Cited

FOREIGN PATENT DOCUMENTS

| CN | 102768443 A | * | 11/2012 | ....... G02F 1/133707 |
|---|---|---|---|---|
| CN | 103257479 A | | 8/2013 | |
| CN | 105974677 A | | 9/2016 | |
| CN | 107561808 A | | 1/2018 | |
| KR | 20080068778 A | * | 7/2008 | ............... G02F 1/13 |

OTHER PUBLICATIONS

Written Opinion of the International Searching Authority in International application No. PCT/CN2021/100135, dated Mar. 16, 2022.
Chinese Office Action in corresponding Chinese Patent Application No. 202110641753.0 dated Jan. 14, 2022, pp. 1-7.

* cited by examiner

LIQUID CRYSTAL DISPLAY PANEL AND DISPLAY DEVICE

RELATED APPLICATIONS

This application is a Notional Phase of PCT Patent Application No. PCT/CN2021/100135 having international filing date of Jun. 15, 2021, which claims the benefit of priority of Chinese Patent Application No. 202110641753.0 filed on Jun. 9, 2021. The contents of the above applications are all incorporated by reference as if fully set forth herein in their entirety.

FIELD OF DISCLOSURE

The present invention relates to a field of display technology and in particular, to a liquid crystal display panel and a display device.

DESCRIPTION OF RELATED ART

Thin film transistor liquid crystal displays (TFT-LCDs) are a type of liquid crystal display. To satisfy requirements for higher image quality of the liquid crystal displays and meet national targets for energy conservation and emission reduction, light transmittance of liquid crystal displays has become more and more important. In conventional techniques, normally a dielectric constant of liquid crystals is increased, so that a photoelectric curve of the liquid crystals is shifted to the left to match an increase in the light transmittance of the liquid crystals.

However, if the dielectric constant of the liquid crystals is increased to be greater than a dielectric constant of an alignment layer, free charges released from an organic layer located on one side of the alignment layer are easily attracted and attached to the liquid crystals. This causes the free charges to move directionally under an influence of a voltage difference of an electric field generated between upper and lower substrates, resulting in accumulation of the free charges, which in turn leads to residual images.

In summary, there is an urgent need to provide a new liquid crystal display panel and a display device to solve the above-mentioned technical problem.

SUMMARY

The present invention provides a liquid crystal display panel and a display device to solve a technical problem that conventional liquid crystal display panels are prone to have residual images.

Accordingly, the present invention provides a technical solution as follows.

The present invention provides a liquid crystal display panel, comprising:
an array substrate, a counter substrate arranged opposite to the array substrate, and a liquid crystal layer disposed between the array substrate and the counter substrate, wherein the liquid crystal layer comprises a plurality of liquid crystal molecules, and the liquid crystal molecules are polymer-stabilized vertical-alignment liquid crystal molecules;
wherein the array substrate comprises a first substrate, a first alignment layer disposed on one side of the first substrate facing the liquid crystal layer, and a second alignment layer arranged on one side of the first alignment layer away from the liquid crystal layer; a dielectric constant of the first alignment layer is less than a dielectric constant of the liquid crystal molecules; and a dielectric constant of the second alignment layer is greater than the dielectric constant of the liquid crystal molecules.

In the liquid crystal display panel of the present invention, the dielectric constant of the first alignment layer ranges from 3 to 5, and the dielectric constant of the second alignment layer is greater than 10.

In the liquid crystal display panel of the present invention, the first alignment layer has a first thickness in a direction perpendicular to a plane where the first substrate is located; the second alignment layer has a second thickness in the direction perpendicular to the plane where the first substrate is located; and the first thickness is greater than or equal to the second thickness.

In the liquid crystal display panel of the present invention, the first thickness ranges from 60 nanometers to 120 nanometers, and the second thickness ranges from 20 nanometers to 60 nanometers.

In the liquid crystal display panel of the present invention, a material of the first alignment layer and a material of the second alignment layer are polyimide.

In the liquid crystal display panel of the present invention, the counter substrate comprises a second substrate and a third alignment layer disposed on one side of the second substrate facing the liquid crystal layer, and a dielectric constant of the third alignment layer is less than the dielectric constant of the liquid crystal molecules.

In the liquid crystal display panel of the present invention, the counter substrate further comprises a fourth alignment layer, the fourth alignment layer is disposed on one side of the third alignment layer away from the liquid crystal layer, and a dielectric constant of the fourth alignment layer is greater than the dielectric constant of the liquid crystal molecules.

In the liquid crystal display panel of the present invention, the fourth alignment layer has a third thickness in a direction perpendicular to a plane where the first substrate is located, and the third thickness is less than or equal to a thickness of the second alignment layer in the direction perpendicular to the plane where the first substrate is located.

In the liquid crystal display panel of the present invention, the dielectric constant of the first alignment layer is equal to the dielectric constant of the third alignment layer, and the dielectric constant of the second alignment layer is equal to the dielectric constant of the fourth alignment layer.

In the liquid crystal display panel of the present invention, the liquid crystal display panel is a color-filter on array (COA) display panel.

The present invention provides a liquid crystal display panel, comprising:
an array substrate, a counter substrate arranged opposite to the array substrate, and a liquid crystal layer disposed between the array substrate and the counter substrate, wherein the liquid crystal layer comprises a plurality of liquid crystal molecules;
wherein the array substrate comprises a first substrate, a first alignment layer disposed on one side of the first substrate facing the liquid crystal layer, and a second alignment layer disposed on one side of the first alignment layer away from the liquid crystal layer; a dielectric constant of the first alignment layer is less than a dielectric constant of the liquid crystal molecules; and a dielectric constant of the second alignment layer is greater than the dielectric constant of the liquid crystal molecules.

In the liquid crystal display panel of the present invention, the dielectric constant of the first alignment layer ranges from 3 to 5, and the dielectric constant of the second alignment layer is greater than 10.

In the liquid crystal display panel of the present invention, the first alignment layer has a first thickness in a direction perpendicular to a plane where the first substrate is located, the second alignment layer has a second thickness in the direction perpendicular to the plane where the first substrate is located, and the first thickness is greater than or equal to the second thickness.

In the liquid crystal display panel of the present invention, the first thickness ranges from 60 nanometers to 120 nanometers, and the second thickness ranges from 20 nanometers to 60 nanometers.

In the liquid crystal display panel of the present invention, a material of the first alignment layer and a material of the second alignment layer are polyimide.

In the liquid crystal display panel of the present invention, the counter substrate comprises a second substrate and a third alignment layer disposed on one side of the second substrate facing the liquid crystal layer, and a dielectric constant of the third alignment layer is less than the dielectric constant of the liquid crystal molecules.

In the liquid crystal display panel of the present invention, the counter substrate further comprises a fourth alignment layer, the fourth alignment layer is disposed on one side of the third alignment layer away from the liquid crystal layer, and a dielectric constant of the fourth alignment layer is greater than the dielectric constant of the liquid crystal molecules.

In the liquid crystal display panel of the present invention, the fourth alignment layer has a third thickness in a direction perpendicular to a plane where the first substrate is located, and the third thickness is less than or equal to a thickness of the second alignment layer in the direction perpendicular to the plane where the first substrate is located.

In the liquid crystal display panel of the present invention, the dielectric constant of the first alignment layer is equal to the dielectric constant of the third alignment layer, and the dielectric constant of the second alignment layer is equal to the dielectric constant of the fourth alignment layer.

The present invention provides a display device, comprising:
- a liquid crystal display panel, wherein the liquid crystal display panel comprises an array substrate, a counter substrate arranged opposite to the array substrate, and a liquid crystal layer disposed between the array substrate and the counter substrate; the liquid crystal layer comprises a plurality of liquid crystal molecules; the array substrate comprises a first substrate, a first alignment layer disposed on one side of the first substrate facing the liquid crystal layer, and a second alignment layer disposed on one side of the first alignment layer away from the liquid crystal layer; a dielectric constant of the first alignment layer is less than a dielectric constant of the liquid crystal molecules; and a dielectric constant of the second alignment layer is greater than the dielectric constant of the liquid crystal molecules; and
- a backlight module arranged on one side of the liquid crystal display panel.

Advantages of the Present Invention

In the liquid crystal display panel and the display device of the present invention, the liquid crystal display panel has an alignment layer design of combining the first alignment layer and the second alignment layer, the second alignment layer is disposed on one side of the first alignment layer away from the liquid crystal layer, and the dielectric constant of the first alignment layer is designed to be less than the dielectric constant of the liquid crystal molecules to ensure that the display device has high light transmittance. At the same time, the dielectric constant of the second alignment layer is also designed to be greater than the dielectric constant of the liquid crystal molecules, so that not only the high light transmittance is ensured, but also free charges released from an organic layer of the array substrate are attracted by the second alignment layer to prevent generation of residual images, thereby improving display performance.

BRIEF DESCRIPTION OF DRAWINGS

In order to explain the technical solutions of the present invention more clearly, drawings which will be described in the embodiments are briefly introduced hereinafter. Obviously, the accompanying drawings described below are only some embodiments of the present invention. Persons of ordinary skills in the art can obtain other drawings based on these drawings.

DESCRIPTION FOR REFERENCE LABEL

100: liquid crystal display panel; 1: array substrate; 2: counter substrate

3: liquid crystal layer; 31: liquid crystal molecule; 10: first substrate

111: first alignment layer; 110: second alignment layer; 20: second substrate

210: third alignment layer; 211: fourth alignment layer

DETAILED DESCRIPTION OF EMBODIMENTS

The technical solutions of the present invention will be clearly and completely described below in conjunction with the accompanying drawings and with reference to the embodiments of the present invention. Obviously, the described embodiments are only some of the embodiments of the present invention, rather than all the embodiments. Based on the embodiments of the present invention, all other embodiments obtained by those skilled in the art without creative work shall fall within the protection scope of the present invention. In addition, it should be understood that the specific embodiments described herein are only used to illustrate and explain the present invention, and are not used to limit the present invention. In the present invention, unless otherwise specified, the directional terms such as "upper" and "lower" generally refer to upper and lower directions of a device in actual use or working state, and specifically refer to directions in the accompanying drawings. The directional terms "inner" and "outer" are described with respect to an outline of the device.

Figure 1:
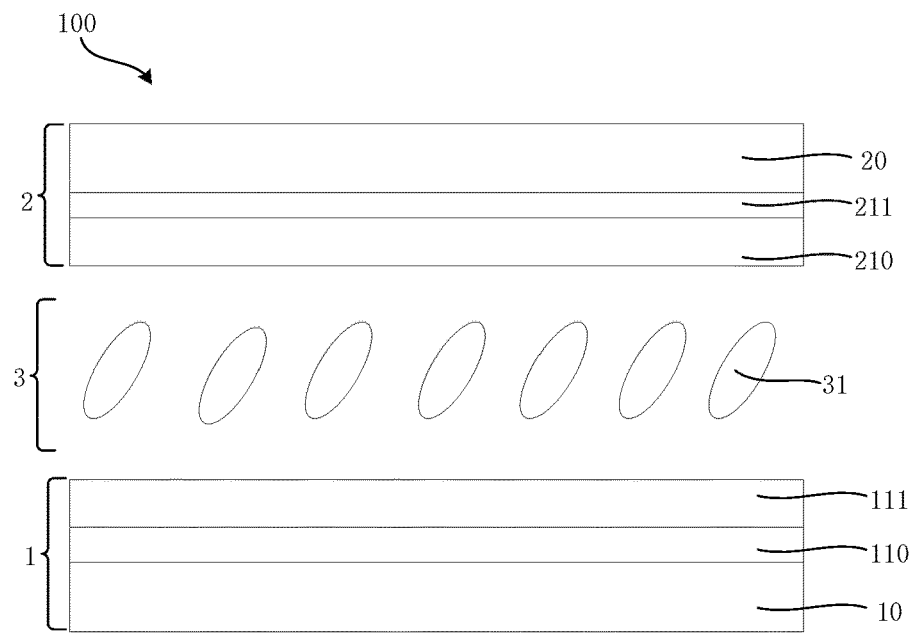
FIG. 1 is a schematic cross-sectional structural view illustrating a liquid crystal display panel according to one embodiment of the present invention.

Please refer to FIG. 1. FIG. 1 is a schematic view illustrating a cross-sectional structure of a liquid crystal display panel 100. The liquid crystal display panel 100 comprises an array substrate 1, a counter substrate 2 arranged opposite to the array substrate 1, and a liquid crystal layer 3 disposed between the array substrate 1 and the counter substrate 2. The liquid crystal layer 3 comprises a plurality of liquid crystal molecules 31. The liquid crystal molecules 31 are rotated by an electric field generated between the array substrate 1 and the counter substrate 2 to control a light output angle, which is a conventional technique, so a detailed information thereof is omitted herein for brevity.

The array substrate 1 comprises a first substrate 10, a first alignment layer 111 disposed on one side of the first substrate 10 facing the liquid crystal layer 3, and a second alignment layer 110 disposed on one side of the first alignment layer 111 away from the liquid crystal layer 3. That is to say, the first alignment layer 111 is disposed close to the liquid crystal layer 3, and the second alignment layer 110 is disposed close to the first substrate 10. The second alignment layer 110 is disposed between the first substrate 10 and the first alignment layer 111.

In the present invention, a dielectric constant of the first alignment layer 111 is less than a dielectric constant of the liquid crystal molecules 31. As the dielectric constant of the liquid crystal molecules 31 is increased, a photoelectric curve of the liquid crystal molecules 31 can be shifted to the left. In other words, the present invention only requires a lower voltage to completely rotate the liquid crystal molecules 31, so light transmittance of the liquid crystal molecules 31 is significantly increased.

The dielectric constant of the first alignment layer 111 is less than the dielectric constant of the liquid crystal molecules 31. The first substrate 10 comprises an organic layer such as a planarization layer, the organic layer is usually made of light-curing or heat-curing materials which can easily release ionic impurities such as free charges, and these ionic impurities cannot be completely cleaned away. Furthermore, a plurality of openings are defined in the first substrate 10, so the free charges can easily enter the first alignment layer 111 through the openings. For a reactive monomer with a higher dielectric constant, it has a stronger polarity, less steric hindrance, and more ionic binding sites, and it more easily attracts the free charges compared to a reactive monomer with a lower dielectric constant. Therefore, the free charges are not absorbed by the first alignment layer 111, and then enter the liquid crystal layer 3 from the first alignment layer 111 and are attracted by the liquid crystal molecules 31. This causes the free charges to move directionally under an influence of a voltage difference of the electric field generated between the array substrate 1 and the counter substrate 2, resulting in accumulation of the free charges, which in turn generates residual images and affects display performance.

Accordingly, in the present invention, the second alignment layer 110 is disposed on one side of the first alignment layer 111 away from the liquid crystal layer 3, and a dielectric constant of the second alignment layer 110 is greater than the dielectric constant of the liquid crystal molecules 31. The free charges in the organic layer first enter the second alignment layer 110 through the openings. Because the dielectric constant of the second alignment layer 110 is greater than the dielectric constant of the liquid crystal molecules 31 and the dielectric constant of the first alignment layer 111, the free charges are attracted by the second alignment layer 110 instead of entering the first alignment layer 111, let alone entering the liquid crystal layer 3 and getting absorbed by the liquid crystal molecules 31, so as to prevent the free charges from moving directionally under the influence of the voltage difference of the electric field generated between the array substrate 1 and the counter substrate 2, thereby preventing generation of the residual images and improving the display performance.

It should be noted that the liquid crystal molecules 31 comprise positive liquid crystal molecules 31 and negative liquid crystal molecules 31. The dielectric constant of the liquid crystal molecules 31 comprise a horizontal dielectric constant and a vertical dielectric constant. A dielectric constant in a direction parallel to a long axis (major axis) of the liquid crystal molecule 31 is defined as the horizontal dielectric constant, and the dielectric constant in a direction perpendicular to the long axis of the liquid crystal molecule 31 is defined as the vertical dielectric constant. In the present invention, when the liquid crystal molecules 31 are positive liquid crystal molecules 31, the horizontal dielectric constant of the liquid crystal molecules 31 is relatively high, and the dielectric constant of the first alignment layer 111 is less than the horizontal dielectric constant of the liquid crystal molecules 31, and the dielectric constant of the second alignment layer 110 is greater than the horizontal dielectric constant of the liquid crystal molecules 31. On the contrary, when the liquid crystal molecules 31 are negative liquid crystal molecules 31, the vertical dielectric constant of the liquid crystal molecules 31 is relatively high, and the dielectric constant of the first alignment layer 111 is less than the vertical dielectric constant of the liquid crystal molecules 31, and the dielectric constant of the second alignment layer 110 is greater than the vertical dielectric constant of the liquid crystal molecules 31.

In the present invention, a comparison between the dielectric constants are a comparison between absolute values of the dielectric constants.

In one embodiment, the dielectric constant of the first alignment layer 111 ranges from 3 to 5, and the dielectric constant of the second alignment layer 110 is greater than 10.

In fact, in the present invention, the first alignment layer 111 is configured for alignment, and the second alignment layer 110 is configured for attracting the free charges. In order to form a stable pretilt angle, a film thickness of the first alignment layer 111 cannot be too thin. When the film thickness of the first alignment layer 111 is too thin, an alignment force is unstable, and the pretilt angle is unstable. The second alignment layer 110 is not configured for alignment. Therefore, a thickness of the second alignment layer 110 can be appropriately reduced to reduce production costs.

Therefore, in one embodiment, a thickness of the first alignment layer 111 in a direction perpendicular to a plane where the first substrate 10 is located is a first thickness, and a thickness of the second alignment layer 110 in the direction perpendicular to the plane where the first substrate 10 is located is a second thickness. The first thickness is greater than or equal to the second thickness.

In one embodiment, the first thickness ranges from 60 nanometers to 120 nanometers, and the second thickness ranges from 20 nanometers to 60 nanometers.

In one embodiment, a material of the first alignment layer 111 and a material of the second alignment layer 110 are polyimide. Certainly, the materials of the first alignment layer 111 and the second alignment layer 110 can be the same or different, and the present invention is not limited in this regard.

Similarly, the counter substrate 2 comprises a second substrate 20 and a third alignment layer 210 disposed at one side of the second substrate 20 facing the liquid crystal layer 3, and a dielectric constant of the third alignment layer 210 is less than the dielectric constant of the liquid crystal molecules 31. The third alignment layer 210 is disposed close to the liquid crystal layer 3 to cause a pretilt angle for realizing the alignment of the liquid crystal molecules 31 on the side of the counter substrate 2.

In one embodiment, the second substrate 20 comprises a color resist layer. The third alignment layer 210 is disposed at one side of the color resist layer and arranged close to the liquid crystal layer 3. The color resist layer at least comprises red color resists, green color resists, and blue color resists. Since the color resist layer is also an organic layer, the color resist layer also releases free charges, just like the organic layer of the array substrate 1 does, and the free charges are attracted by the liquid crystal molecules 31, resulting in residual images. A principle of causing the residual images by the free charges released by the color resist layer is similar to a principle of causing the residual images by the free charges released by the organic layer of the array substrate 1. For details, please refer to the above content, which is not described in detail here.

Therefore, in the present invention, the counter substrate 2 further comprises a fourth alignment layer 211, and the fourth alignment layer 211 is disposed on one side of the third alignment layer 210 away from the liquid crystal layer 3. A dielectric constant of the fourth alignment layer 211 is greater than the dielectric constant of the liquid crystal molecules 31. The fourth alignment layer 211 is used to attract the free charges released by the color resist layer to prevent the free charges released from the color resist layer from entering the liquid crystal layer 3 and being attracted by the liquid crystal molecules 31, thereby preventing generation of the residual images and further improving the display performance.

In one embodiment, a film thickness of the fourth alignment layer 211 can be equal to the film thickness of the second alignment layer 110. Further, most of an organic material of the liquid crystal display panel 100 is concentrated in the array substrate 1, and only a little of the organic material is arranged in the counter substrate 2, so an amount of the free charges released by the first substrate 10 is more than an amount of the free charges released by the second substrate 20. Therefore, the film thickness of the fourth alignment layer 211 can be designed to be less than the film thickness of the second alignment layer 110. In details, the fourth alignment layer 211 has a third thickness in the direction perpendicular to the plane where the first substrate 10 is located, and the third thickness is less than or equal to the thickness of the second alignment layer 110 in the direction perpendicular to the plane where the first substrate 10 is located.

In one embodiment, the dielectric constant of the first alignment layer 111 is equal to the dielectric constant of the third alignment layer 210, and the dielectric constant of the second alignment layer 110 is equal to the dielectric constant of the fourth alignment layer 211.

In one embodiment, the liquid crystal molecules 31 are polymer-stabilized vertical alignment (PSVA) liquid crystal molecules 31, and this type of liquid crystal molecules 31 has higher light transmittance; however, the present invention is not limited in this regard.

Specifically, molecular structural formulas of the first alignment layer 111 and the third alignment layer 210 have a side chain group, and the side chain group captures a polymerizable group in each of the liquid crystal molecules 31 to form the pretilt angle in a vertical alignment process. Therefore, the molecular structural formulas of the first alignment layer 111 and the third alignment layer 210 contain the side chain group, and the molecular structural formulas of the second alignment layer 110 and the fourth alignment layer 211 have no side chain groups.

Figure 2:
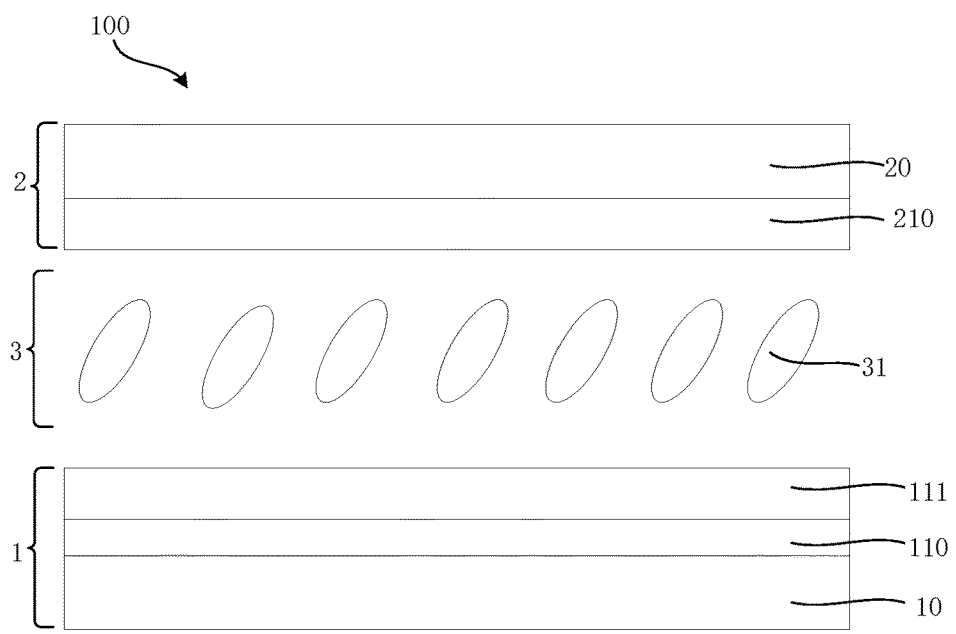
FIG. 2 is a schematic cross-sectional structural view illustrating the liquid crystal display panel according to another embodiment of the present invention.

In one embodiment, please refer to FIG. 2, which is a schematic cross-sectional structural view of the liquid crystal display panel 100 according to another embodiment of the present invention. The liquid crystal display panel 100 can be a color-filter on array (COA) display panel. The COA technology is an integration technique in which a color photoresist layer is directly fabricated on the array substrate 1, thus effectively solving a problem of light leakage caused by misalignment in a cell alignment process of a liquid crystal display device, and significantly increasing an aperture ratio of the liquid crystal display device.

It can be understood that, for the COA liquid crystal display panel 100, since the color resist layer is not disposed in the counter substrate 2, the second substrate 20 does not release the free charges. Therefore, this embodiment is only required to have one layer of the third alignment layer 210 for alignment, instead of having at least two alignment layers with different dielectric constants like the array substrate 1 does, which is beneficial to reduce production costs.

Specifically, the first substrate 10 further comprises a substrate, a thin film transistor array layer disposed on the substrate, and a planarization layer covering the thin film transistor array layer. The thin film transistor array layer comprises a gate layer, a gate insulating layer, a source/drain metal layer, a semiconductor layer, etc. The second substrate 20 further comprises a substrate, a black matrix layer, and a common electrode layer. Since this is a conventional technique, a detailed description thereof is omitted herein for brevity.

The present invention also provides a display device. The display device comprises the liquid crystal display panel 100 in the above-mentioned embodiment and a backlight module. The backlight module is arranged on one side of the liquid crystal display panel 100, and the display device can be wearable devices, such as smart bracelets, smart watches, virtual reality (VR) devices, mobile smart phones, e-books, e-newspapers, televisions, personal laptops, and lighting equipment.

Advantages of the present application: In the liquid crystal display panel and the display device of the present invention, the liquid crystal display panel has an alignment layer design of combining the first alignment layer and the second alignment layer, the second alignment layer is disposed on one side of the first alignment layer away from the liquid crystal layer, the dielectric constant of the first alignment layer is designed to be less than the dielectric constant of the liquid crystal molecules to ensure that the display device has high transmittance, and the dielectric constant of the second alignment layer is also designed to be greater than the dielectric constant of the liquid crystal molecules, so that not only high light transmittance is ensured, but also the free charges released from the organic layer of the array substrate are attracted to the second alignment layer to prevent the residual images, thereby improving the display performance.

In summary, although the present invention has been disclosed as above in preferable embodiments, the above-mentioned preferable embodiments are not intended to limit the present invention. Those of ordinary skill in the art can make various changes and modifications without departing from the spirit and scope of the present invention. Therefore, the protection scope of the present invention shall be defined by the appended claims.

What is claimed is:

1. A liquid crystal display panel, comprising:
an array substrate, a counter substrate arranged opposite to the array substrate, and a liquid crystal layer disposed between the array substrate and the counter substrate, wherein the liquid crystal layer comprises a plurality of liquid crystal molecules, and the liquid crystal molecules are polymer-stabilized vertical-alignment liquid crystal molecules;
wherein the array substrate comprises a first substrate, a first alignment layer disposed on one side of the first substrate facing the liquid crystal layer, and a second alignment layer arranged on one side of the first alignment layer away from the liquid crystal layer; a dielectric constant of the first alignment layer is less than a dielectric constant of the liquid crystal molecules; a dielectric constant of the second alignment layer is greater than the dielectric constant of the liquid crystal molecules; and the second alignment layer absorbs free charges from the first substrate.

2. The liquid crystal display panel according to claim 1, wherein the dielectric constant of the first alignment layer ranges from 3 to 5, and the dielectric constant of the second alignment layer is greater than 10.

3. The liquid crystal display panel according to claim 1, wherein the first alignment layer has a first thickness in a direction perpendicular to a plane where the first substrate is located, the second alignment layer has a second thickness in the direction perpendicular to the plane where the first substrate is located, and the first thickness is greater than or equal to the second thickness.

4. The liquid crystal display panel according to claim 3, wherein the first thickness ranges from 60 nanometers to 120 nanometers, and the second thickness ranges from 20 nanometers to 60 nanometers.

5. The liquid crystal display panel according to claim 1, wherein a material of the first alignment layer and a material of the second alignment layer are polyimide.

6. The liquid crystal display panel according to claim 1, wherein the counter substrate comprises a second substrate and a third alignment layer disposed on one side of the second substrate facing the liquid crystal layer, and a dielectric constant of the third alignment layer is less than the dielectric constant of the liquid crystal molecules.

7. The liquid crystal display panel according to claim 6, wherein the counter substrate further comprises a fourth alignment layer, the fourth alignment layer is disposed on one side of the third alignment layer away from the liquid crystal layer, and a dielectric constant of the fourth alignment layer is greater than the dielectric constant of the liquid crystal molecules.

8. The liquid crystal display panel according to claim 7, wherein the fourth alignment layer has a third thickness in a direction perpendicular to a plane where the first substrate is located, and the third thickness is less than or equal to a thickness of the second alignment layer in the direction perpendicular to the plane where the first substrate is located.

9. The liquid crystal display panel according to claim 7, wherein the dielectric constant of the first alignment layer is equal to the dielectric constant of the third alignment layer, and the dielectric constant of the second alignment layer is equal to the dielectric constant of the fourth alignment layer.

10. The liquid crystal display panel according to claim 1, wherein the liquid crystal display panel is a color-filter on array (COA) display panel.

11. A liquid crystal display panel, comprising:
an array substrate, a counter substrate arranged opposite to the array substrate, and a liquid crystal layer disposed between the array substrate and the counter substrate, wherein the liquid crystal layer comprises a plurality of liquid crystal molecules;
wherein the array substrate comprises a first substrate, a first alignment layer disposed on one side of the first substrate facing the liquid crystal layer, and a second alignment layer disposed on one side of the first alignment layer away from the liquid crystal layer; a dielectric constant of the first alignment layer is less than a dielectric constant of the liquid crystal molecules; a dielectric constant of the second alignment layer is greater than the dielectric constant of the liquid crystal molecules; and the second alignment layer absorbs free charges from the first substrate.

12. The liquid crystal display panel according to claim 11, wherein the dielectric constant of the first alignment layer ranges from 3 to 5, and the dielectric constant of the second alignment layer is greater than 10.

13. The liquid crystal display panel according to claim 11, wherein the first alignment layer has a first thickness in a direction perpendicular to a plane where the first substrate is located, the second alignment layer has a second thickness in the direction perpendicular to the plane where the first substrate is located, and the first thickness is greater than or equal to the second thickness.

14. The liquid crystal display panel according to claim 13, wherein the first thickness ranges from 60 nanometers to 120 nanometers, and the second thickness ranges from 20 nanometers to 60 nanometers.

15. The liquid crystal display panel according to claim 11, wherein a material of the first alignment layer and a material of the second alignment layer are polyimide.

16. The liquid crystal display panel according to claim 11, wherein the counter substrate comprises a second substrate and a third alignment layer disposed on one side of the second substrate facing the liquid crystal layer, and a dielectric constant of the third alignment layer is less than the dielectric constant of the liquid crystal molecules.

17. The liquid crystal display panel according to claim 16, wherein the counter substrate further comprises a fourth alignment layer, the fourth alignment layer is disposed on one side of the third alignment layer away from the liquid crystal layer, and a dielectric constant of the fourth alignment layer is greater than the dielectric constant of the liquid crystal molecules.

18. The liquid crystal display panel according to claim 17, wherein the fourth alignment layer has a third thickness in a direction perpendicular to a plane where the first substrate is located, and the third thickness is less than or equal to a thickness of the second alignment layer in the direction perpendicular to the plane where the first substrate is located.

19. The liquid crystal display panel according to claim 17, wherein the dielectric constant of the first alignment layer is equal to the dielectric constant of the third alignment layer, and the dielectric constant of the second alignment layer is equal to the dielectric constant of the fourth alignment layer.

20. A display device, comprising:
a liquid crystal display panel, wherein the liquid crystal display panel comprises an array substrate, a counter substrate arranged opposite to the array substrate, and a liquid crystal layer disposed between the array substrate and the counter substrate; the liquid crystal layer comprises a plurality of liquid crystal molecules; the array substrate comprises a first substrate, a first alignment layer disposed on one side of the first substrate facing the liquid crystal layer, and a second alignment layer disposed on one side of the first alignment layer away from the liquid crystal layer; a dielectric constant of the first alignment layer is less than a dielectric constant of the liquid crystal molecules; a dielectric constant of the second alignment layer is greater than the dielectric constant of the liquid crystal molecules; and the second alignment layer absorbs free charges from the first substrate; and a backlight module arranged on one side of the liquid crystal display panel.

* * * * *